United States Patent
Ueda et al.

(10) Patent No.: US 7,006,348 B1
(45) Date of Patent: Feb. 28, 2006

(54) SOLID ELECTROLYTIC CAPACITOR AND MANUFACTURING METHOD OF THE SAME

(75) Inventors: Akira Ueda, Sannohe (JP); Katsuharu Yamada, Sannohe (JP); Minoru Funahashi, Sannohe (JP)

(73) Assignee: Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 11/231,789

(22) Filed: Sep. 22, 2005

(30) Foreign Application Priority Data

Sep. 22, 2004 (JP) ............................. 2004-275921

(51) Int. Cl.
*H01G 4/32* (2006.01)
*H01G 9/00* (2006.01)
*H11G 9/145* (2006.01)

(52) U.S. Cl. ................. 361/530; 361/532; 29/25.03
(58) Field of Classification Search ............... 361/523, 361/525, 528–533, 541; 29/25.03
See application file for complete search history.

(56) References Cited

U.S. PATENT DOCUMENTS

| | | | | |
|---|---|---|---|---|
| 5,754,394 A | * | 5/1998 | Evans et al. ................. | 361/516 |
| 6,515,847 B1 | * | 2/2003 | Naraya ........................ | 361/523 |
| 6,519,137 B1 | * | 2/2003 | Nitta et al. .................. | 361/525 |
| 6,914,769 B1 | * | 7/2005 | Welsch et al. .............. | 361/508 |

FOREIGN PATENT DOCUMENTS

| | | |
|---|---|---|
| JP | 2000-114108 A | 4/2000 |
| JP | 2000-114109 A | 4/2000 |
| JP | 2001-196270 A | 7/2001 |
| JP | 2002-110464 A | 4/2002 |
| JP | 2002-299181 A | 10/2002 |
| JP | 2004-128048 A | 4/2004 |

* cited by examiner

*Primary Examiner*—Eric W. Thomas
(74) *Attorney, Agent, or Firm*—Arent Fox, PLLC

(57) ABSTRACT

A solid electrolytic capacity has an anode foil 2 having dielectric oxide layer 16 formed on surface thereof, a cathode foil 4 having whiskers 18 that are formed on surface thereof and hold carbide grains 17, a separator paper 6 and solid electrolytic layers 12 formed of a conducting polymer. The anode foil 2 and the cathode foil 4 were rolled together across the separator paper 6. The solid electrolytic layers 12 are formed between the anode foil 2 and the cathode foil 4. Thickness of a layer where the whiskers 18 hold the carbide grains 17 is 1 $\mu$m to 5 $\mu$m. A method of manufacturing a solid electrolytic capacitor having steps of generating whiskers on surface of a cathode foil after coating carbide grains on the surface of the cathode foil and drying the carbide grains, rolling the cathode foil and an anode foil having dielectric oxide layer formed on surface thereof across a separator, impregnating polymerizable monomers and an oxidizing reagent into the separator, polymerizing the polymerizable monomers and forming solid electrolyte layers between the cathode foil and the anode foil.

10 Claims, 3 Drawing Sheets

SOLID ELECTROLYTIC CAPACITOR AND MANUFACTURING METHOD OF THE SAME

BACKGROUND OF THE INVENTION

1. Field of the Invention

This invention generally relates to solid electrolytic capacitors that may be used for a wide variety of electronics devices, and more particularly, to a roll-formed solid electrolytic capacitor and a surface-mounted solid electrolytic capacitor having a solid electrolyte formed of conducting polymer.

2. Description of the Related Art

Recently, there are demands for enhancing capacity of an electrolytic capacitor, for downsizing the electrolytic capacitor and further for lowering impedance at higher frequencies of the electrolytic capacitor, as electronics devices are digitalized.

The solid electrolytic capacitor has an excellent frequency characteristic relative to other electrolytic capacitors, and thus attracts attentions. A chemical coat mainly formed of valve metal like aluminum or tantalum is used as an anode in the solid electrolytic capacitor. One of typical structures of the solid electrolytic capacitors having an electrode foil formed of aluminum is such that an aluminum chemical foil used for an anode having a dielectric oxide layer and an aluminum chemical foil used for a cathode are rolled together across a separator paper and are formed into a capacitor element into which monomers and an oxidizing reagent are impregnated. The capacitor element is housed in, for example, an aluminum case or a resinoid case, and is sealed.

The solid electrolytic capacitor mentioned above has a compact size and has a high capacity, and is used widely. Polypyrrole, polythiophene and polyaniline or the like is used as an electrolyte. Polyethylenedioxythiophene having a low resistivity is mainly used in order to reduce an ESR (equivalent series resistance).

The solid electrolytic capacitor mentioned above has a compact size, a high capacity and a low ESR, and is easy to form a chip, and suitable for surface mounting. In terms of the above, the solid electrolytic capacitor is fundamental to downsize electronics devices and to make the electronics devices sophisticated and low in price.

However, tan$\delta$ (dielectric loss) and the ESR are affected by the adhesive condition between the formed solid electrolyte and the cathode foil in the solid electrolytic capacitor mentioned above. In addition, in a case where the formed solid electrolyte is not dense, the contact area is reduced and the tan$\delta$ is increased. Further, the adhesiveness between the solid electrolyte and the cathode is reduced, and the ESR is increased.

In addition, in a case where a valve metal is used for the cathode, the capacity of the solid electrolytic capacitor mentioned above as a capacitor is determined from a dielectric constant of the oxide layer of the valve metal, facing area between the dielectric and the cathode, and the combined capacity of the anode and the cathode. That is, even if the cathode having high capacity is used, the combined capacity never exceeds the capacity of the anode, and an increase of the capacity is limited. In addition, in a case where a conducting polymer layer, which is dense and has a high yield point, cannot be formed, a capacitor having a high achievement ratio cannot be obtained.

In order to solve these problems, Japanese Patent Application No. 2000-114108 (hereinafter referred to as Document 1) and Japanese Patent Application No. 2000-114109 (hereinafter referred to as Document 2) disclose an arrangement in which a coated layer formed of, for example, metal nitride like TiN, TaN, NbN or a valve metal like Ti, Zr, Ta, Nb is formed on surface of a cathode foil, and the appearance ratio of capacity is thus increased. Japanese Patent Application No. 2002-299181 (hereinafter referred to as Document 3) and Japanese Patent Application No. 2004-128048 (hereinafter referred to as Document 4) disclose an arrangement in which the foil of Document 1 and Document 2 is treated, and the impedance is advanced. In addition, Japanese Patent Application No. 2001-196270 (hereinafter referred to as Document 5) discloses an arrangement in which a cathode is coated with a carbide material through vacuum evaporation method.

In addition, there is a problem that an expansion of a metal case or a closing rubber occurs and features degrades, if the solid electrolytic capacitor mentioned above is used for a surface mounted chip parts of portrait style or transverse style and is subjected to soldering at reflow.

In order to solve these problems, Japanese Patent Application No. 2002-110464 (hereinafter referred to as Document 6) discloses an art of forming a separator of resin having heat resistance that does not dissolve or does not react at high temperature with a residual oxidizing reagent after polymerizing reaction or an acid that the oxidizing reagent resolves into.

However, the arrangements disclosed in Documents 1 and 2 have a problem that a cost merit degrades. Because the metal nitride and the valve metal are expensive and there is a need for pretreating the cathode and treating the cathode during the manufacturing process.

In addition, in the art of Document 3 and 4, the anode metal is simply coated with the carbide material, and the interface resistance between the carbon and the metal is enhanced. Therefore, it is not possible to reduce the ESR and the tan$\delta$. Further, the coated carbide material is detached easily, which causes a problem that feature degradation is promoted through long-term use.

In addition, the arrangements of Document 5 and 6 have a problem that an increase of a capacity is limited. Because reduction of density of the resin having heat resistance is limited and conducting polymer cannot be filled sufficiently.

SUMMARY OF THE INVENTION

The present invention has an object to provide a solid electrolytic capacitor being superior in frequency response and having a high capacity.

According to an aspect of the present invention, preferably, there is provided a solid electrolytic capacitor including an anode foil having dielectric oxide layer formed on surface thereof, a cathode foil having whiskers that are formed on surface thereof and hold carbide grains, a separator; and solid electrolytic layers formed of a conducting polymer. The anode foil and the cathode foil are rolled together across the separator. The solid electrolytic layers are formed between the anode foil and the cathode foil.

With the above-mentioned configuration, the cathode foil is not directly in touch with the conducting polymer layer, but the cathode foil is in touch with the conducting polymer layer through an organic matter, the carbide grains. Adhesiveness between the cathode foil and the conducting polymer layer is advanced. In addition, a void between the carbide grains is larger than an etching pit of an ordinary oxide layer. And the conducting polymer layer is formed effectively. Accordingly, the interface resistance between the cathode foil and the conducting polymer layer is reduced, and it is possible to reduce the tanδ and the ESR. In addition, the cathode foil, the carbide grains and the conducting polymer layer are conducted electrically during an energization of the solid electrolytic capacitor. The carbide grains and the conducting polymer layer do not affect the capacity as a cathode of the solid electrolytic capacitor. And the anode side electrical capacity is combined capacity of the solid electrolytic capacitor. It is possible to advance a capacity achievement ratio of the solid electrolytic capacitor in accordance with the present invention.

According to an aspect of the present invention, preferably, there is provided a method of manufacturing a solid electrolytic capacitor including steps of generating whiskers on surface of a cathode foil after coating carbide grains on the surface of the cathode foil and drying the carbide grains, rolling the cathode foil and an anode foil having dielectric oxide layer formed on surface thereof across a separator, impregnating polymerizable monomers and an oxidizing reagent into the separator, polymerizing the polymerizable monomers and forming solid electrolyte layers between the cathode foil and the anode foil.

In accordance with the present invention, it is possible to make the cathode foil be in touch with the conducting polymer layer through an organic matter, the carbide grains. The adhesiveness between the cathode foil and the conducting polymer layer is advanced. In addition, the void between the carbide grains is larger than the etching pit of the ordinary oxide layer. And the conducting polymer layer is formed effectively. Accordingly, the interface resistance between the cathode foil and the conducting polymer layer is reduced, and it is possible to reduce the tanδ and the ESR.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

Figure 1:
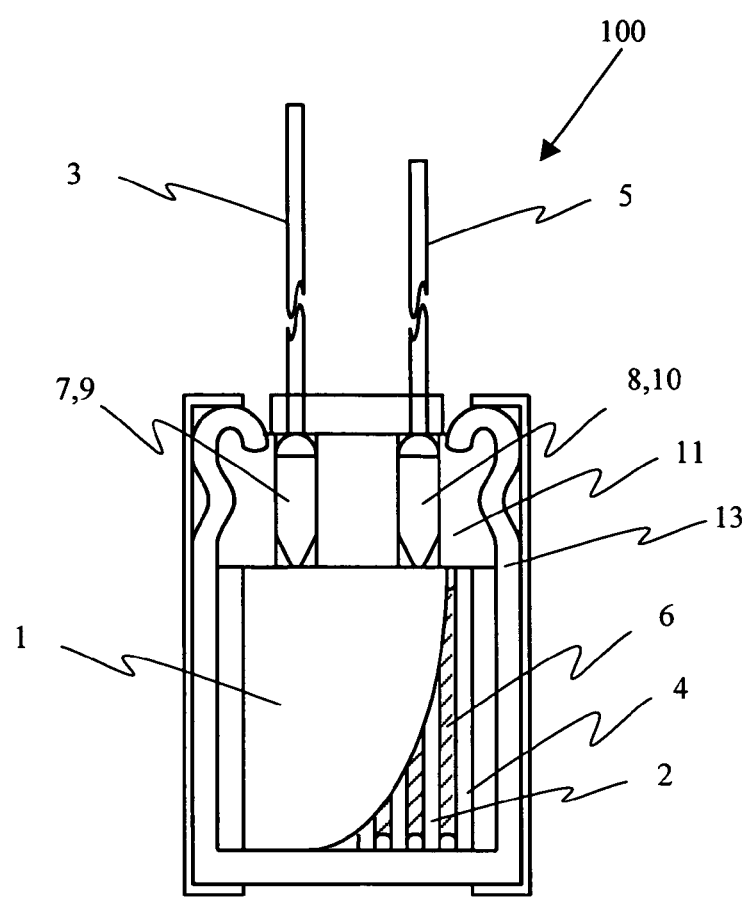
FIG. 1 illustrates a partially cutout cross sectional view of an example of the solid electrolytic capacitor in accordance with the present invention.

FIG. 1 illustrates a partially cutout cross-sectional view of an example of the solid electrolytic capacitor in accordance with the present invention. As shown in FIG. 1, a solid electrolytic capacitor 100 in accordance with the embodiment has a structure in which a capacitor 1 is housed in an aluminum case 13 having a cylinder shape with a bottom. The capacitor 1 is a cylindrical capacitor, in which an anode foil 2 and a cathode foil 4 are rolled together across a separator paper 6. A detail description of the anode foil 2, the cathode foil 4 and the separator paper 6 will be given later.

An anode side tab terminal 3 is extracted from the anode foil 2 through a round bar portion 7 and a rib 9. A cathode side tab terminal 5 is extracted from the cathode foil 4 through a round bar portion 8 and a rib 10. The anode side tab terminal 3 and the cathode side tab terminal 5 are extracted outside from an opening portion of the aluminum case 13. A closing portion 11 is attached at the opening portion of the aluminum case 13 in order to prevent the formation of a conducting polymer mentioned below at an area adjacent to the round bar portion 7 and 8 and the rib 9 and 10. For example, an IIR (rubber formed of isobutylene-isopropylene copolymer), an EPT (rubber formed of ethylene-propylene copolymer) or a blend of the IIR and the EPT may be used as the closing portion 11.

Figure 2:
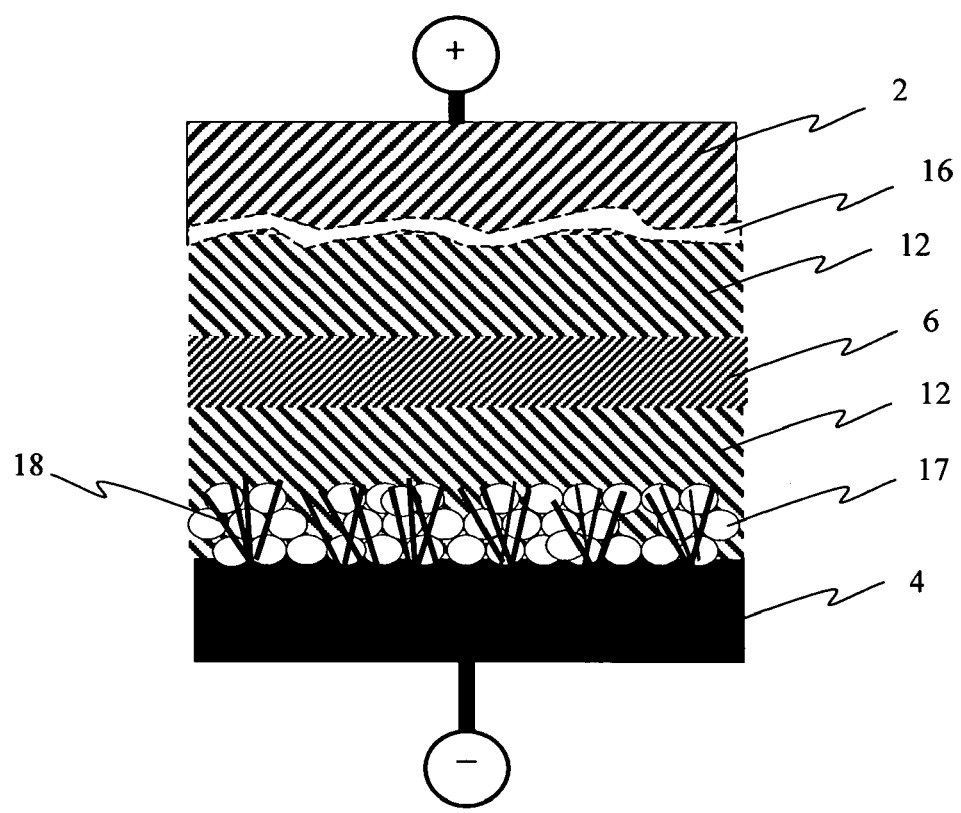
FIG. 2 illustrates a cross sectional view of the anode foil, the separator paper and the cathode foil.

FIG. 2 illustrates a cross-sectional view of the anode foil 2, the separator paper 6 and the cathode foil 4. As shown in FIG. 2, the separator paper 6 is sandwiched between the anode foil 2 and the cathode foil 4. Conducting polymer layers 12 having a function as solid electrolyte layers are formed at gaps between the anode foil 2 and the separator paper 6 and between the separator paper 6 and the cathode foil 4.

The anode foil 2 is formed of a valve metal having a dielectric oxide layer 16 on a surface thereof. A metal like aluminum can be used for the anode foil 2. It is possible to form the dielectric oxide layer 16 by etching and chemically oxidizing the surface of the anode foil 2.

In addition, the anode foil 2 is treated chemically and thermally several times after rolling the anode foil 2, the separator paper 6 and the cathode foil 4. The anode foil 2 is subjected to the chemical treatment at a voltage near a formation voltage of the dielectric oxide layer 16, using chemical liquid mainly containing 0.5% to 2% ammonium adipate by weight. The anode foil 2 is subjected to the thermal treatment in temperature range 200 degrees C. to 280 degrees C. An oxide layer is therefore formed on the valve metal exposed on an end surface of the anode foil 2 while the anode foil 2 is cut by specific length or on the valve metal exposed while the anode foil 2 is damaged by terminal connection.

Whiskers 18 are formed on a surface of the cathode foil 4. The whiskers 18 hold carbide grains 17 physically. It is possible to form the structure mentioned above by forming the whiskers 18, after coating the carbide grains 17 on the cathode foil 4 and drying the carbide grains 17.

In this case, the cathode foil 4 is not directly in touch with the conducting polymer layer 12, but the cathode foil 4 is in touch with the conducting polymer layer 12 through an organic matter, the carbide grains 17. The adhesiveness between the cathode foil 4 and the conducting polymer layer 12 is advanced. In addition, a void between the carbide grains 17 is larger than an etching pit of an ordinary oxide layer. And the conducting polymer layer is formed effectively. Accordingly, an interface resistance between the cathode foil 4 and the conducting polymer layer 12 is reduced, and it is possible to reduce the tanδ and the ESR. In addition, the cathode foil 4, the carbide grains 17 and the conducting polymer layer 12 are conducted electrically during the energization of the solid electrolytic capacitor 100. The carbide grains 17 and the conducting polymer layer 12 do not affect the capacity as a cathode of the solid electrolytic capacitor 100. And the anode side electrical capacity is a combined capacity of the solid electrolytic capacitor 100. It is possible to advance the capacity achievement ratio of the solid electrolytic capacitor 100.

A material used for the cathode foil 4 is not limited particularly if the material can be rolled and can be fabricated into a foil. For example, Al, Cu, Fe or Ni can be used for the cathode foil 4. In particular, it is preferred to use aluminum. Because aluminum is easy to process and is low in price, and the whiskers can be formed easily with aluminum. In addition, a thickness of the cathode foil 4 is approximately 20 μm to 200 μm. In this case, it is possible to roll the cathode foil 4, and the cathode side tab terminal 5 can be caulked and connected by ultrasonic.

The carbide grains 17 are not limited particularly if the carbide grains include carbon. For example, carbide grains like carbon, graphite, carbon nitride or carbon compound can be used for the carbide grains 17. In particular, it is preferred to use a carbon black that is easy to process finely and is low in price. In addition, preferably the thickness of a layer where the carbide grains 17 are held is 1 μm to 10 μm, in order to keep the conduction between the cathode foil 4 and the cathode side tab terminal 5 without detachment of the carbide grains 17. Further, more preferably the thickness of the layer where the carbide grains 17 are held is 1 μm to 5 μm, in order to reduce a connection resistance between the cathode side tab terminal 5 and the cathode foil 4.

An electrolytic paper mainly formed of Manila fiber or a nonwoven fabric mainly formed of PET (polyethylene terephthalate) can be used for the separator paper 6. In a case where the nonwoven fabric is used for the separator paper 6, the reactivity between the conducting polymer layer 12 and the separator paper 6 and between an oxidizing reagent mentioned below and the separator paper 6 is extremely low at a high temperature during the reflow treatment or the like. The degradation of characteristic features due to increased pressure because of the expansion or generated gas or the like does not occur. In addition, preferably a fiber diameter of PET is 1 μm to 10 μm, in order to secure the capacity due to an advancement of a filling rate of the conducting polymer layer mentioned below and to reduce the ESR and the tanδ.

It is possible to form the conducting polymer layer 12 by impregnating polymerizable monomers and an oxidizing reagent into the separator paper 6 after rolling the anode foil 2, the cathode foil 4 and the separator paper 6. In this case, the adhesiveness between the conducting polymer layer 12 and the cathode foil 4 is increased. It is therefore possible to reduce the ESR.

The conducting polymer layer 12 is formed of a polymerizable material like polyethylene dioxythiophene or the like. In a case where polyethylene dioxythiophene is used for the conducting polymer layer 12, a resistivity of the conducting polymer layer 12 and the ESR are reduced. It is possible to form this conducting polymer layer 12 of polyethylene dioxythiophene by polymerizing polymerizable polymer like 3,4-ethylene dioxythiophene using an oxidizing reagent.

Instead of the polymerizable monomer, a monomer solution in which the polymerizable monomer and a volatility liquid solution are blended at a ratio 1:1 to 1:3 can be used. Hydrocarbon like pentane, ether like tetrahydrofuran, ester like ethyl formate, ketone like acetone, alcohol like methanol, or nitrogen compound like acetonitrile or the like can be used for this volatility liquid solution. It is preferred to use methanol, ethanol or acetone or the like.

It is possible to use ferric p-toluene sulfonate, a mixture of ferric p-toluene sulfonate and ferric dodecylbenzenesulfonate, or a mixture of ferric p-toluene sulfonate and ferric methoxybenzenesulfonate or the like that are suitable for formation of a polymer having high conductivity, as the oxidizing reagent. In particular, in a case where a mixed oxidizing reagent like the latter two examples is used, dopants in the polymer are stabilized and the heat resistance is stabilized.

It is preferable to use butanol or a mixture of butanol and alcohol having more than one carbon as the solvent mentioned above. In this case, oxidizing reagent elements are dispersed and polymerization reaction of the polymerizable monomer is promoted. And it is possible to shorten polymerization time.

The ratio of the solvent mentioned above and the acid ferric may be optional. It is preferable to use a liquid solution containing 40% to 70% of the acid ferric by weight. In this case, the concentration of the oxidizing reagent is high. And a polymer that is more dense and has a high yield point, is formed through the polymerization reaction of the polymerizable monomer mentioned above. The conducting polymer layer 12 therefore excels in conductivity. And it is possible to reduce the ESR. In addition, preferably the compounding ratio of the polymerizable monomer and the oxidizing reagent is 1:3 to 1:6.

Figure 3:
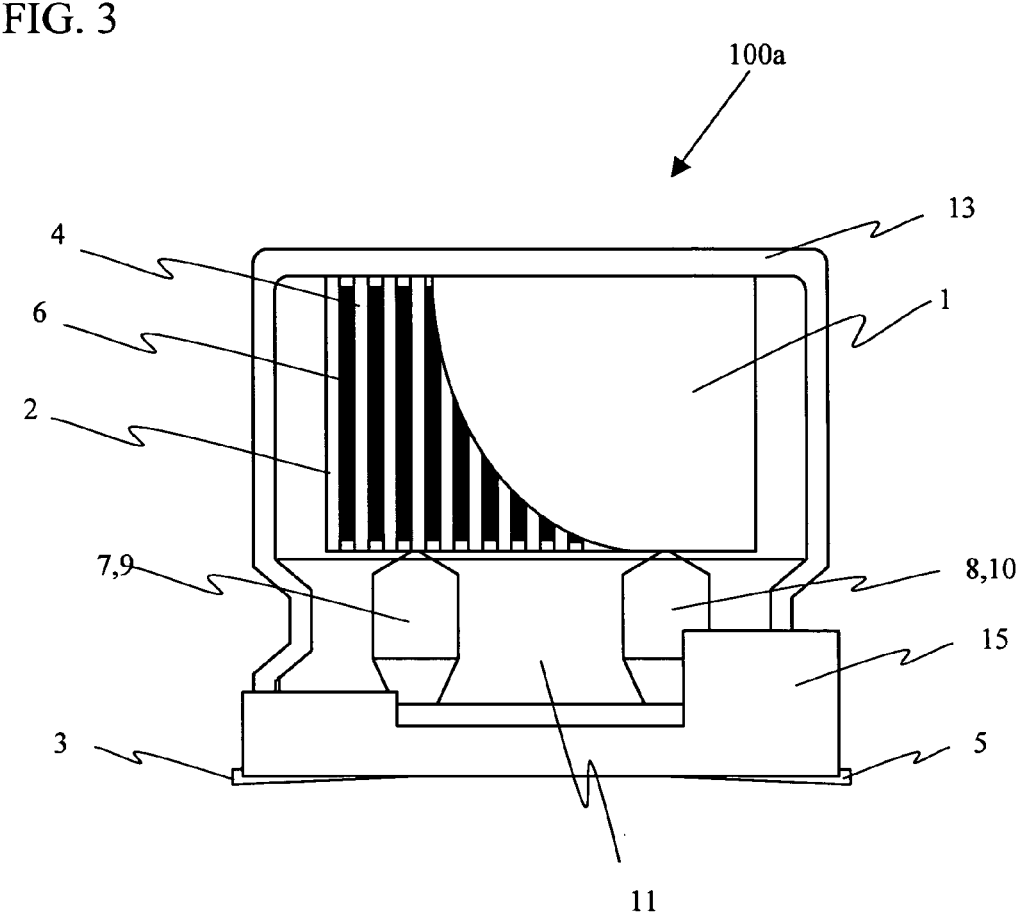
FIG. 3 illustrates a partially cutout cross sectional view of another example of the solid electrolytic capacitor in accordance with the present invention.

FIG. 3 illustrates a partially cutout cross sectional view of a capacitor 100a which is another example of the solid electrolytic capacitor 100 in accordance with the present invention. The capacitor 100a is different from the capacitor 100 in that a base plate 15 having heat resistance and electrical insulation is provided outside of the closing portion 11. The capacitor 100a has same actions and same effects as the capacitor 100, and is used as a surface mounted solid electrolytic capacitor.

EXAMPLES

Example 1

In an example 1, the solid electrolytic capacitor 100 shown in FIG. 1 was formed. The anode foil 2 was formed of an aluminum foil, which was subjected to an etching treatment and a chemical treatment and had 0.7 cm width, 11.5 cm length, and 100 μm thickness. The cathode foil 4 was formed of an aluminum, which had 0.7 cm width, 13.1 cm length and 50 μm thickness. Whiskers were formed on the surface of the cathode foil 4. The whiskers held carbide grains. The thickness of the layer where the carbide grains were held was 2 μm. An electrolytic paper mainly formed of Manila fiber was used for the separator paper 6. The normal rated voltage of the capacitor 1 was 4WV.

Next, after rolling the anode foil 2 and the cathode foil 4 together across the separator paper 6, the anode foil 2 was subjected to a chemical treatment at a voltage near the formation voltage of the dielectric oxide layer of the anode foil 2 using chemical liquid mainly containing 0.5% to 2% ammonium adipate by weight, and to a thermal treatment in temperature range 200 degrees C. to 280 degrees C.

Then, 3,4-ethylene dioxythiophene and 1-butanol solution containing ferric p-toluene sulfonate were impregnated into the separator paper 6. The separator paper 6 was kept 16 hours in the atmosphere in temperature range 40 degrees C. to 150 degrees C. The conducting polymer layer 12 formed of polyethylene dioxythiophene was fabricated.

Next, the capacitor 1 was housed in the aluminum case 13. The aluminum case 13 was closed. The aluminum case 13 was subjected to an aging treatment. The solid electrolytic capacitor 100 having 8 mm diameter and 11.5 mm length was fabricated.

Example 2

In an example 2, the solid electrolytic capacitor 100a shown in FIG. 3 was formed. The anode foil 2 was formed of an aluminum foil, which was subjected to an etching treatment and a chemical treatment and had 0.7 cm width, 17.5 cm length, and 110 μm thickness. The cathode foil 4 was formed of an aluminum, which had 0.7 cm width, 19.1 cm length and 50 μm thickness. Whiskers were formed on the surface of the cathode foil 4. The whiskers held carbide grains. The thickness of the layer in which the whiskers held the carbide grains was 2 μm. A nonwoven fabric formed of polyethylene terephthalate was used for the separator paper 6. The normal rated voltage of the capacitor 1 was 4WV.

Next, after rolling the anode foil 2 and the cathode foil 4 together across the separator paper 6, the anode foil 2 was subjected to a chemical treatment at a voltage near the formation voltage of the dielectric oxide layer of the anode foil 2 using chemical liquid mainly containing 0.5% to 2% ammonium adipate by weight, and to a thermal treatment in temperature range 200 degrees C. to 280 degrees C.

Then, 3,4-ethylene dioxythiophene and 1-butanol solution containing ferric p-toluene sulfonate were impregnated into the separator paper 6. The separator paper 6 was kept 16 hours in the atmosphere in temperature range 40 degrees C. to 150 degrees C. The conducting polymer layer 12 formed of polyethylene dioxythiophene was fabricated.

Next, the capacitor 1 was housed in the aluminum case 13. The aluminum case 13 was closed. The aluminum case 13 was subjected to an aging treatment. The solid electrolytic capacitor 100a having 10 mm diameter and 12.4 mm length was fabricated.

Comparative Example 1

In a comparative example 1, a solid electrolytic capacitor was formed in the same condition as the example 1, except that the cathode foil 4 had 0.7 cm width, 11.5 cm length and 80 μm thickness and is formed of aluminum subjected to a chemical treatment at a low formation voltage and subjected to a high magnification etching treatment, the whiskers 18 were not formed, and the carbide grains 17 were not held.

Comparative Example 2

In a comparative example 2, a solid electrolytic capacitor was formed in the same condition as the example 2, except that the cathode foil 4 had 0.7 cm width, 17.5 cm length and 80 μm thickness and is formed of aluminum subjected to a chemical treatment at a low formation voltage and subjected to a high magnification etching treatment, and a nonwoven fabric was mainly formed of Manila fiber.

(Analysis)

Table 1 shows an electrical capacity at 120 MHz frequency, the tanδ, the ESR at 100 kHz frequency and a leakage current after energization of normal rated voltage two minutes of the solid electrolytic capacitor in accordance with the example 1 and the comparative example 1. Fifty solid electrolytic capacitors in accordance with the example 1 and fifty solid electrolytic capacitors in accordance with the comparative example 1 were fabricated, and each value in Table 1 shows average value thereof.

TABLE 1

|  | Electrical capacity ($\mu F$) | tanδ (%) | Leakage current ($\mu A$/2 minutes) | ESR (mΩ) |
|---|---|---|---|---|
| Example 1 | 1069.1 | 1.57 | 56.41 | 4.78 |
| Comparative Example 1 | 546.4 | 2.61 | 50.28 | 5.82 |

As shown in Table 1, with respect to the solid electrolytic capacitor in accordance with the example 1, the electrical capacity was increased considerably and the tanδ and the ESR were reduced, relative to the solid electrolytic capacitor in accordance with the comparative example 1. This is because the adhesiveness between the carbide grains and the conducting polymer layer was advanced, forming condition of the conducting polymer layer in the large void between the carbide grains was fine, and the interface resistance was reduced.

In addition, the cathode foil, the carbide grains and the conducting polymer layer were conducted electrically. The capacitor as a cathode was not affected by the existence of the carbide grains and the conducting polymer layer. The anode side electrical capacity was the combined capacity of the solid electrolytic capacitor. It is thought that the capacity achievement ratio of the solid electrolytic capacitor was advanced considerably.

Next, Table 2 shows outer appearance after being subjected to the thermal treatment in reflow (two minutes at more than 200 degrees C. and two times of peak at 250 degrees C.), the electrical capacity at 120 MHz frequency, the tans, the ESR at 100 kHz and the leakage current after thermal treatment by aging voltage and energization of normal rated voltage two minutes of the solid electrolytic capacitor in accordance with the example 2 and the comparative example 2. Fifty solid electrolytic capacitors in accordance with the example 2 and fifty solid electrolytic capacitors in accordance with the comparative example 2 were fabricated, and each value of Table 2 shows average value thereof.

TABLE 2

|  | Heat resistance in reflow (expansion) | | Electrical capacity ($\mu F$) | ESR (mΩ) | Leakage current ($\mu A$/2 minutes) |
|---|---|---|---|---|---|
|  | before experiment | after experiment | | | |
| Example 2 | non | non | 1203 | 5.89 | 41.6 |
| Comparative example 2 | non | existence | 651 | 7.92 | 1506.7 |

As shown in Table 2, with respect to the solid electrolytic capacitor in accordance with the example 2, the electrical capacitor was increased considerably and the ESR was reduced, relative to the solid electrolytic capacitor in accordance with the comparative example 2. In addition, there was no expansion after the reflow treatment. The increase of the leakage current due to the voltage treatment was restrained. The heat resistance was advanced. It is thought that this is because the reactivity between polyethylene terephthalate which is the base component of the separator and the conducting polymer layer, the residual oxidizing reagent and the residual solvent was extremely low and generation of gas was restrained, and increase of internal pressure did not occur. In addition, it is thought that high capacity and low ESR were kept because the whiskers held the carbide grains on the cathode and alternation and detachment did not occur.

As described above, the result is obtained that the electrical capacity was increased considerably and the tanδ and the ESR was reduced with respect to the solid electrolytic capacitor in accordance with the example 1. In addition, the result was obtained that the electrical capacity was increased considerably, the ESR was reduced and the heat resistance and the electrical insulation were advanced with respect to the solid electrolytic capacitor in accordance with the example 2.

While the preferred embodiment of the prevent invention have been illustrated in detail, the invention is not limited to the specific embodiments above. In addition, it will be appreciated that the invention is susceptible of modification, variation and change without departing from the proper and fair meaning of the accompanying claims.

What is claimed is:

1. A solid electrolytic capacitor comprising:
    an anode foil having dielectric oxide layer formed on surface thereof;
    a cathode foil having whiskers that are formed on surface thereof and hold carbide grains;
    a separator; and
    solid electrolytic layers formed of a conducting polymer, wherein:
    the anode foil and the cathode foil are rolled together across the separator; and
    the solid electrolytic layers are formed between the anode and the cathode.

2. The solid electrolytic capacitor as claimed 1, wherein thickness of a layer where the whiskers hold the carbide grains is 1 $\mu$m to 5 $\mu$m.

3. The solid electrolytic capacitor as claimed 1, wherein the conducting polymer is formed through polymerization of polymerizable monomers by an oxidizing reagent.

4. The solid electrolytic capacitor as claimed 3, wherein the porymerizable monomer is 3,4-ethylene dioxythiophene.

5. The solid electrolytic capacitor as claimed 3, wherein the oxidizing reagent is one of a ferric p-toluene sulfonate, a mixture of the ferric p-toluene sulfonate and a ferric dodecylbenzenesulfonate, or a mixture of the ferric p-toluene sulfonate and a ferric methoxybenzenesulfonate.

6. The solid electrolytic capacitor as claimed 3, wherein a solvent of the oxide reagent is butanol or a mixture of butanol and alcohol having more than one carbon.

7. The solid electrolytic capacitor as claimed 3, wherein concentration of a solution in the oxidizing reagent is 40% to 70% by weight.

8. The solid electrolytic capacitor as claimed 1, wherein the separator is formed of nonwoven fabric formed mainly of polyethylene terephthalate.

9. The solid electrolytic capacitor as claimed 8, wherein a fiber diameter of the separator is 1 $\mu$m to 10 $\mu$m.

10. A method of manufacturing a solid electrolytic capacitor comprising steps of:
    generating whiskers on surface of a cathode foil after coating carbide grains on the surface of the cathode foil and drying the carbide grains;
    rolling the cathode foil and an anode foil having dielectric oxide layer formed on surface thereof across a separator; and
    impregnating polymerizable monomers and an oxidizing reagent into the separator, polymerizing the polymerizable monomers and forming solid electrolyte layers between the cathode foil and the anode foil.

* * * * *